US012711379B2

(12) United States Patent
Gugulothu et al.

(10) Patent No.: US 12,711,379 B2
(45) Date of Patent: Aug. 18, 2026

(54) METHODS AND SYSTEMS FOR OBTAINING END-TO-END CLASSIFICATION MODEL USING MIXTURE DENSITY NETWORK

(71) Applicant: Tata Consultancy Services Limited, Mumbai (IN)

(72) Inventors: Narendhar Gugulothu, Hyderabad (IN); Sanjay Purushottam Bhat, Hyderabad (IN); Tejas Bodas, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 518 days.

(21) Appl. No.: 18/367,025

(22) Filed: Sep. 12, 2023

(65) Prior Publication Data

US 2024/0289611 A1 Aug. 29, 2024

(30) Foreign Application Priority Data

Feb. 28, 2023 (IN) ............................ 202321013622

(51) Int. Cl.
*G06F 16/00* (2019.01)
*G06N 3/08* (2023.01)

(52) U.S. Cl.
CPC ..................................... *G06N 3/08* (2013.01)

(58) Field of Classification Search
CPC ........................................................ G06N 3/08

(Continued)

(56) References Cited

U.S. PATENT DOCUMENTS 10,973,468 B2 * 4/2021 Zhao .................. A61B 5/02438 707/707
11,556,789 B2 * 1/2023 Gugulothu ........... G06N 3/0442 707/707

(Continued)

FOREIGN PATENT DOCUMENTS

CN 115039140 A 9/2022
WO WO 2019/153039 A1 8/2019

OTHER PUBLICATIONS

Jiang et al., "Optimizing E-tailer Profits and Customer Savings: Pricing Multistage Customized Online Bundles," Marketing Science, 30(4):737-752 (2011).

(Continued)

*Primary Examiner* — Alexandria Y Bromell
(74) *Attorney, Agent, or Firm* — Finnegan, Henderson, Farabow, Garrett & Dunner, LLP

(57) ABSTRACT

The disclosure relates generally to methods and systems for obtaining an end-to-end classification model using a mixture density network (MDN). Conventional MDNs have been mostly used in regression tasks due to their direct applicability, but not for classification tasks. The MDN model of the present disclosure captures the intrinsic multi-modality in the data and learns the distribution parameters. According to the present disclosure, input training samples are passed through the mixture density network to learn the distribution parameters and to model the intrinsic multi-modality present in the data. The learned parameters are then used to evaluate the cumulative distribution function (CDF) value with respect to each of the original input feature or learnt latent feature by passing inputs through a simple feed-forward layer. The evaluated CDF values are then fed to a softmax layer with LASSO penalty on its weights to predict the classification scores.

15 Claims, 9 Drawing Sheets

(58) Field of Classification Search
USPC .............................................................. 706/15
See application file for complete search history.

(56) References Cited

U.S. PATENT DOCUMENTS

| | | | | |
|---|---|---|---|---|
| 11,935,298 | B2 * | 3/2024 | Hobbs | G06N 3/0499 707/707 |
| 2019/0124045 | A1 * | 4/2019 | Zong | H04L 63/0245 707/707 |
| 2021/0092140 | A1 * | 3/2021 | Kazerounian | H04L 63/1483 707/707 |
| 2022/0092415 | A1 * | 3/2022 | Qiu | G06N 3/0475 707/707 |

OTHER PUBLICATIONS

Mukherjee et al., "AR-MDN: Associative and Recurrent Mixture Density Networks for eRetail Demand Forecasting," (2018).

* cited by examiner

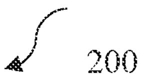

Receive a plurality of d-dimensional training samples, and an annotated class label associated with each d-dimensional training sample of the plurality of d-dimensional training samples 202

Train the mixture density network with each d-dimensional training sample at a time, until the plurality of d-dimensional training samples are completed, using the annotated class label associated with each d-dimensional training sample, to obtain the end-to-end classification model (204), wherein the mixture density network comprises a feed-forward layer, a mixture density network layer, a linear layer, and a softmax layer, and wherein training the mixture density network with each d-dimensional training sample comprises:

Passing the d-dimensional training sample to the feed-forward layer to obtain a latent vector associated with the d-dimensional training sample 204a

Passing the latent vector associated with the d-dimensional training sample, to the mixture density network layer, to obtain one or more Gaussian mixture parameters associated with the d-dimensional training sample 204b

Evaluating one or more weighted cumulative distribution function (CDF) values associated with the d-dimensional training sample, from the one or more Gaussian mixture parameters associated with the d-dimensional training sample, using a cumulative distribution function 204c

Passing the one or more weighted cumulative distribution function (CDF) values associated with the d-dimensional training sample, to the linear layer, and the softmax layer, to obtain a predicted class label associated with the d-dimensional training sample 204d

A

FIG. 2A

METHODS AND SYSTEMS FOR OBTAINING END-TO-END CLASSIFICATION MODEL USING MIXTURE DENSITY NETWORK

PRIORITY CLAIM

This U.S. patent application claims priority under 35 U.S.C. § 119 to: Indian Patent Application No. 202321013622, filed on Feb. 28, 2023. The entire contents of the aforementioned application are incorporated herein by reference.

TECHNICAL FIELD

The disclosure herein generally relates to the field of mixture density networks, and more specifically to methods and systems for obtaining an end-to-end classification model using a mixture density network.

BACKGROUND

Mixture Density Networks (MDNs) have gained popularity in recent years due to their superiority in modelling multi-modality in the data and learning distribution parameters. The MDNs have been combined with popular deep learning techniques such as recurrent neural networks (RNNs), convolutional neural networks (CNNs), transformer neural networks and generative adversarial networks (GANs) and used in tasks like time series forecasting, motion prediction, anomaly detection, volatility prediction, and knowledge graphs. The MDNs have been mostly used in regression tasks due to their direct applicability to regression and superiority in modelling the intrinsic multimodality.

Despite their popularity and superiority, the MDNs have not been used much for classification tasks as the use of the MDN parameters for classification is not straight forward and there is no existing approach for doing this. Further, there are certain applications in which learning the parameters of distribution is very crucial along with classification and one such application is product bundling. The product bundling is a strategy used for selling two or more products together in a package, often at a discounted price. Of late, the product bundling has gained traction and is being used in many fields including retail, music, services, food, e-commerce, airlines, tourism, etc. However, the present MDN based techniques for approximating the distribution and learning the parameters of underlying data for classification tasks are limited.

SUMMARY

Embodiments of the present disclosure present technological improvements as solutions to one or more of the above-mentioned technical problems recognized by the inventors in conventional systems.

In an aspect, a processor-implemented method for obtaining an end-to-end classification model using a mixture density network is provided. The method including the steps of: receiving, a plurality of d-dimensional training samples, and an annotated class label associated with each d-dimensional training sample of the plurality of d-dimensional training samples; and training, the mixture density network with each d-dimensional training sample at a time, until the plurality of d-dimensional training samples are completed, using the annotated class label associated with each d-dimensional training sample, to obtain the end-to-end classification model, wherein the mixture density network comprises a feed-forward layer, a mixture density network layer, a linear layer, and a softmax layer, and wherein training the mixture density network with each d-dimensional training sample comprises: passing each d-dimensional training sample to the feed-forward layer to obtain a latent vector associated with each d-dimensional training sample; passing the latent vector associated with each d-dimensional training sample, to the mixture density network layer, to obtain one or more Gaussian mixture parameters associated with each d-dimensional training sample; evaluating one or more weighted cumulative distribution function (CDF) values associated with the d-dimensional training sample, from the one or more Gaussian mixture parameters associated with each d-dimensional training sample, using a cumulative distribution function (CDF); passing the one or more weighted cumulative distribution function (CDF) values associated with each d-dimensional training sample, to the linear layer, and the softmax layer, to obtain a predicted class label associated with each d-dimensional training sample; determining a value of a cross-entropy loss function of the mixture density network, using the predicted class label, associated with each d-dimensional training sample and the associated annotated class label; and updating one or more network parameters of the mixture density network, based on the value of a cross-entropy loss function, for training with a next d-dimensional training sample; receiving, a d-dimensional input sample having d number of input dimensions that are associated with a predefined application, and one or more input values associated with the d number of input dimensions of the d-dimensional input sample; and passing, the d-dimensional input sample and the one or more input values associated with the d number of input dimensions of the d-dimensional input sample, to the end-to-end classification model, to obtain the predicted class label associated with the d-dimensional input sample.

In another aspect, a system for obtaining an end-to-end classification model using a mixture density network is provided. The system includes: a memory storing instructions; one or more Input/Output (I/O) interfaces; and one or more hardware processors coupled to the memory via the one or more I/O interfaces, wherein the one or more hardware processors are configured by the instructions to: receive a plurality of d-dimensional training samples, and an annotated class label associated with each d-dimensional training sample of the plurality of d-dimensional training samples; and train the mixture density network with each d-dimensional training sample at a time, until the plurality of d-dimensional training samples are completed, using the annotated class label associated with each d-dimensional training sample, to obtain the end-to-end classification model, wherein the mixture density network comprises a feed-forward layer, a mixture density network layer, a linear layer, and a softmax layer, and wherein training the mixture density network with each d-dimensional training sample comprises: passing each d-dimensional training sample to the feed-forward layer to obtain a latent vector associated with each d-dimensional training sample; passing the latent vector associated with each d-dimensional training sample, to the mixture density network layer, to obtain one or more Gaussian mixture parameters associated with each d-dimensional training sample; evaluating one or more weighted cumulative distribution function (CDF) values associated with each d-dimensional training sample, from the one or more Gaussian mixture parameters associated with each d-dimensional training sample, using a cumulative distribution function (CDF); passing the one or more weighted cumulative distribution function (CDF) values associated with each d-dimensional training sample, to the linear layer, and the softmax layer, to obtain a predicted class label associated with each d-dimensional training sample; determining a value of a cross-entropy loss function of the mixture density network, using the predicted class label, associated with each d-dimensional training sample and the associated annotated class label; and updating one or more network parameters of the mixture density network, based on the value of a cross-entropy loss function, for training with a next d-dimensional training sample; receive a d-dimensional input sample having d number of input dimensions that are associated with a predefined application, and one or more input values associated with the d number of input dimensions of the d-dimensional input sample; and pass the d-dimensional input sample and the one or more input values associated with the d number of input dimensions of the d-dimensional input sample, to the end-to-end classification model, to obtain the predicted class label associated with the d-dimensional input sample.

In yet another aspect, there are provided one or more non-transitory machine-readable information storage mediums comprising one or more instructions which when executed by one or more hardware processors cause: receiving a plurality of d-dimensional training samples, and an annotated class label associated with each d-dimensional training sample of the plurality of d-dimensional training samples; training the mixture density network with each d-dimensional training sample at a time, until the plurality of d-dimensional training samples are completed, using the annotated class label associated with each d-dimensional training sample, to obtain the end-to-end classification model, wherein the mixture density network comprises a feed-forward layer, a mixture density network layer, a linear layer, and a softmax layer, and wherein training the mixture density network with each d-dimensional training sample comprises: passing each d-dimensional training sample to the feed-forward layer to obtain a latent vector associated with each d-dimensional training sample; passing the latent vector associated with each d-dimensional training sample, to the mixture density network layer, to obtain one or more Gaussian mixture parameters associated with each d-dimensional training sample; evaluating one or more weighted cumulative distribution function (CDF) values associated with each d-dimensional training sample, from the one or more Gaussian mixture parameters associated with each d-dimensional training sample, using a cumulative distribution function (CDF); passing the one or more weighted cumulative distribution function (CDF) values associated with each d-dimensional training sample, to the linear layer, and the softmax layer, to obtain a predicted class label associated with each d-dimensional training sample; determining a value of a cross-entropy loss function of the mixture density network, using the predicted class label, associated with each d-dimensional training sample and the associated annotated class label; and updating one or more network parameters of the mixture density network, based on the value of a cross-entropy loss function, for training with a next d-dimensional training sample; receiving a d-dimensional input sample having d number of input dimensions that are associated with a predefined application, and one or more input values associated with the d number of input dimensions of the d-dimensional input sample; and passing the d-dimensional input sample and the one or more input values associated with the d number of input dimensions of the d-dimensional input sample, to the end-to-end classification model, to obtain the predicted class label associated with the d-dimensional input sample.

In an embodiment, each d-dimensional training sample comprises d number of input dimensions.

In an embodiment, the annotated class label associated with each d-dimensional training sample is of a plurality of annotated class labels corresponding to the plurality of d-dimensional training samples.

In an embodiment, the one or more weighted cumulative distribution function (CDF) values associated with the d-dimensional training sample, are evaluated from the one or more Gaussian mixture parameters associated with the d-dimensional training sample, using the cumulative distribution function, by passing one or more values associated with the d number of input dimensions of the d-dimensional training sample.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A and 2B illustrate exemplary flow diagrams of a processor-implemented method for obtaining an end-to-end classification model using a mixture density network, in accordance with some embodiments of the present disclosure.

DETAILED DESCRIPTION

Figure 1:
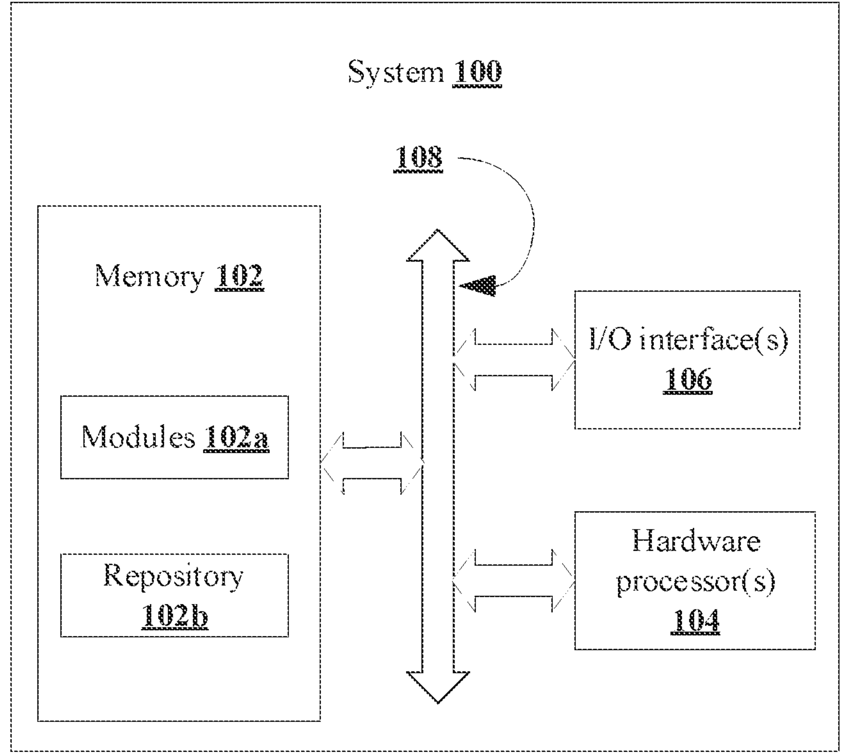
FIG. 1 is an exemplary block diagram of a system for obtaining an end-to-end classification model using a mixture density network, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Product bundling is a strategy of selling two or more products together in a package, often at a discounted price. Of late, product bundling has gained traction and is being used in many fields including retail, music, services, food, e-commerce, airlines, tourism, etc. More specifically, product bundling is a common revenue management technique where the idea is to offer different items for sale as part of a bundle with the idea of increasing revenue. Given a particular bundle of products, one is often interested in identifying a revenue-optimal selling price for the bundle.

In product bundling, availability of historical sales data is very scarce and because of this taking actionable insights becomes very difficult. One way of tackling bundle data scarcity is by using item level sales data. To achieve this, one trains item level classification models and uses them to learn more about bundles. Here, the item sales data is in the form of indicator variables parameterized by the offered price for the item (1 for item being sold at the offered price and 0 otherwise). Each customer purchases an item if the realization of her willingness-to-pay (WTP) variable is more than the offered price. One trains a classification model with such item level data to learn the parameters of willingness-to-pay distribution while classifying the input sample as sale or no sale sample. The learned item level WTP distribution parameters are then used to estimate the WTP distribution for the corresponding bundle (of subset of such items) which can then be used to determine the revenue optimal price for the bundle. The item level sales data is multi-modal in nature because of external factors such as seasonality, holidays, festivals, reviews, discounts, promotions, and different categories of the customers. So, the trained item level model should be able to capture the multi-modality present in the sales data.

Conventional works in this domain are on bundle pricing where customers are assumed to have deterministic willingness-to-pay (WTP) and the revenue optimal bundle price is obtained in this setting. Some other techniques in this domain considers bundling with more than two commodities and formulates the bundle pricing problem as a mixed integer linear program. Apart from pricing, one is also interested in selecting the right combination of bundles to offer for sale. There is another work to consider a joint bundle optimization and pricing problem, where a customer's random choice for bundle is modeled using the multinomial logit choice model (MNL). A drawback with such models is that the customer WTP for a bundle is captured by sophisticated random variables such as Gumbel or generalized extreme value (GEV) so that the optimization problem is amenable to analysis. No such evidence is available to suggest that the WTP distribution should be restricted to such variables and in fact must be discovered or learnt from the underlying data.

On the other side, mixture density networks (MDNs) have been used in regression tasks due to their direct applicability to regression and superiority in modelling the intrinsic multimodality of the data by leveraging mixtures of distributions. Despite their superiority, the MDNs have not been used for classification tasks as the use of the MDN parameters for classification is not straight forward and there is no existing approach for doing this. For certain applications such as product bundling, the existing MDN based frame works for the classification tasks are very limited.

The present disclosure solves the technical problems in the art for obtaining the end-to-end classification model using the mixture density network (MDN) for the classification tasks such as product bundling applications. The architecture of the MDN of the present disclosure captures the intrinsic multi-modality in the data and learns the distribution parameters. According to the present disclosure, input training samples are passed through the mixture density network to learn the distribution parameters and to model the intrinsic multi-modality present in the data. The learned parameters are then used to evaluate the cumulative distribution function (CDF) value with respect to each of the original input feature or learnt latent feature by passing inputs through a simple feed-forward layer. The evaluated CDF values are then fed to a softmax layer with least absolute shrinkage and selection operator (LASSO) penalty on its weights. The LASSO penalty helps to have influence of only the important dimension's CDF values on the predicted class scores. The training is performed end-to-end manner by calculating the cross-entropy loss between the class labels and predicted scores. The present disclosure focuses on aspects of learning the bundle WTP from existing item level data using MDN's and using the learned distribution for the corresponding bundle price optimization.

Referring now to the drawings, and more particularly to FIG. 1 through FIG. 5D, where similar reference characters denote corresponding features consistently throughout the figures, there are shown preferred embodiments and these embodiments are described in the context of the following exemplary systems and/or methods.

FIG. 1 is an exemplary block diagram of a system 100 for obtaining an end-to-end classification model using a mixture density network, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102*a* and a repository 102*b* for storing data processed, received, and generated by one or more of the plurality of modules 102*a*. The plurality of modules 102*a* may include routines, programs, objects, components, data structures, and so on, which perform particular tasks or implement particular abstract data types.

The plurality of modules 102*a* may include programs or computer-readable instructions or coded instructions that supplement applications or functions performed by the system 100. The plurality of modules 102*a* may also be used as, signal processor(s), state machine(s), logic circuitries, and/or any other device or component that manipulates signals based on operational instructions. Further, the plurality of modules 102*a* can be used by hardware, by computer-readable instructions executed by the one or more hardware processors 104, or by a combination thereof. In an embodiment, the plurality of modules 102*a* can include various sub-modules (not shown in FIG. 1). Further, the memory 102 may include information pertaining to input(s)/output(s) of each step performed by the processor(s) 104 of the system 100 and methods of the present disclosure.

The repository 102*b* may include a database or a data engine. Further, the repository 102*b* amongst other things, may serve as a database or includes a plurality of databases for storing the data that is processed, received, or generated as a result of the execution of the plurality of modules 102*a*. Although the repository 102*b* is shown internal to the system 100, it will be noted that, in alternate embodiments, the repository 102*b* can also be implemented external to the system 100, where the repository 102*b* may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102*b* may be distributed between the system 100 and the external database.

Figure 2B:
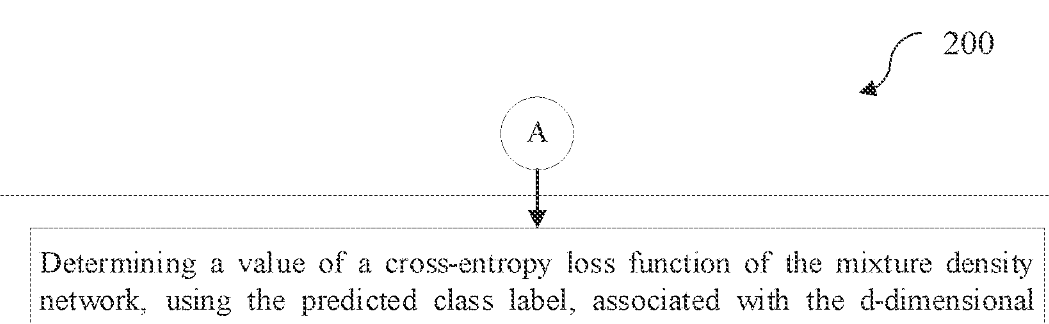

Referring to FIGS. 2A and 2B, components and functionalities of the system 100 are described in accordance with an example embodiment of the present disclosure. For example, FIGS. 2A and 2B illustrate exemplary flow diagrams of a processor-implemented method 200 for obtaining an end-to-end classification model using a mixture density network, in accordance with some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to receive a plurality of d-dimensional training samples, and an annotated class label associated with each d-dimensional training sample of the plurality of d-dimensional training samples. Each d-dimensional training sample comprises d number of input dimensions that are associated with a predefined application. In an embodiment, the predefined application is an application or a domain such as the product bundling (many fields including retail, music, services, food, e-commerce, airlines, tourism, etc.), for which the end-to-end classification model is to be applied.

In an embodiment, the input dimensions are the input variables or the independent variables or the parameters that are associated with the predefined application. For example, in retail product bundling, an item level sale input variables are the input dimensions. An exemplary item level sale input variables for an exemplary retail product bundling are a price ($X_1$), promotions ($X_2$), a customer group ($X_3$).

An annotated class label associated with each d-dimensional training sample is of a plurality of annotated class labels corresponding to the plurality of d-dimensional training samples. In an embodiment, the plurality of annotated class labels is associated with a target variable or a dependent variable or a parameter and depends on the type of product bundling application. An exemplary item level sale target variable for the exemplary retail product bundling is 'type of sale (Y)'. For example, in retail product bundling, the plurality of annotated class labels may be 'sale' (represented with '1') and 'no sale' (represented with '0') to specify the 'type of sale (Y)'.

Table 1 shows an exemplary item level sale data having 3 exemplary item level sale input variables and one target variable, presented in the form of the plurality of 3-dimensional training samples and the annotated class label associated with each d-dimensional training sample. Each row data in Table 1 is one training sample, having values associated with 3-dimensional training samples and the corresponding annotated class label.

TABLE 1

| Price ($X_1$) | Promotions ($X_2$) | Customer group ($X_3$) | Type of Sale (Y) |
|---|---|---|---|
| 1 | 1 | 1 | 1 |
| 3.01 | 1 | 2 | 0 |
| 5.02 | 1 | 3 | 1 |
| 8.03 | 0 | 1 | 1 |
| 9.03 | 0 | 2 | 1 |
| 11.04 | 1 | 1 | 0 |
| 15.05 | 0 | 3 | 0 |
| 20.07 | 0 | 1 | 1 |
| 24.08 | 1 | 1 | 0 |
| 30.1 | 0 | 3 | 1 |

As shown in Table 1, the input variables are the price ($X_1$), the promotions ($X_2$), the customer group ($X_3$), and the target variable is Type of Sale (Y). Each row data in Table 1 is one training sample, for example, {3.01, 1, 2, 0}, wherein {3.01, 1, 2} is 3-dimensional training sample and {0} is the annotated class label corresponding to {3.01, 1, 2}.

At step 204 of the method 200, the one or more hardware processors 104 of the system 100 are configured to train the mixture density network with each d-dimensional training sample at a time (for example, each row data of Table 1), until the plurality of d-dimensional training samples received at step 202 of the method 200 are completed, using the annotated class label associated with each d-dimensional training sample, to obtain the end-to-end classification model.

Figure 3:
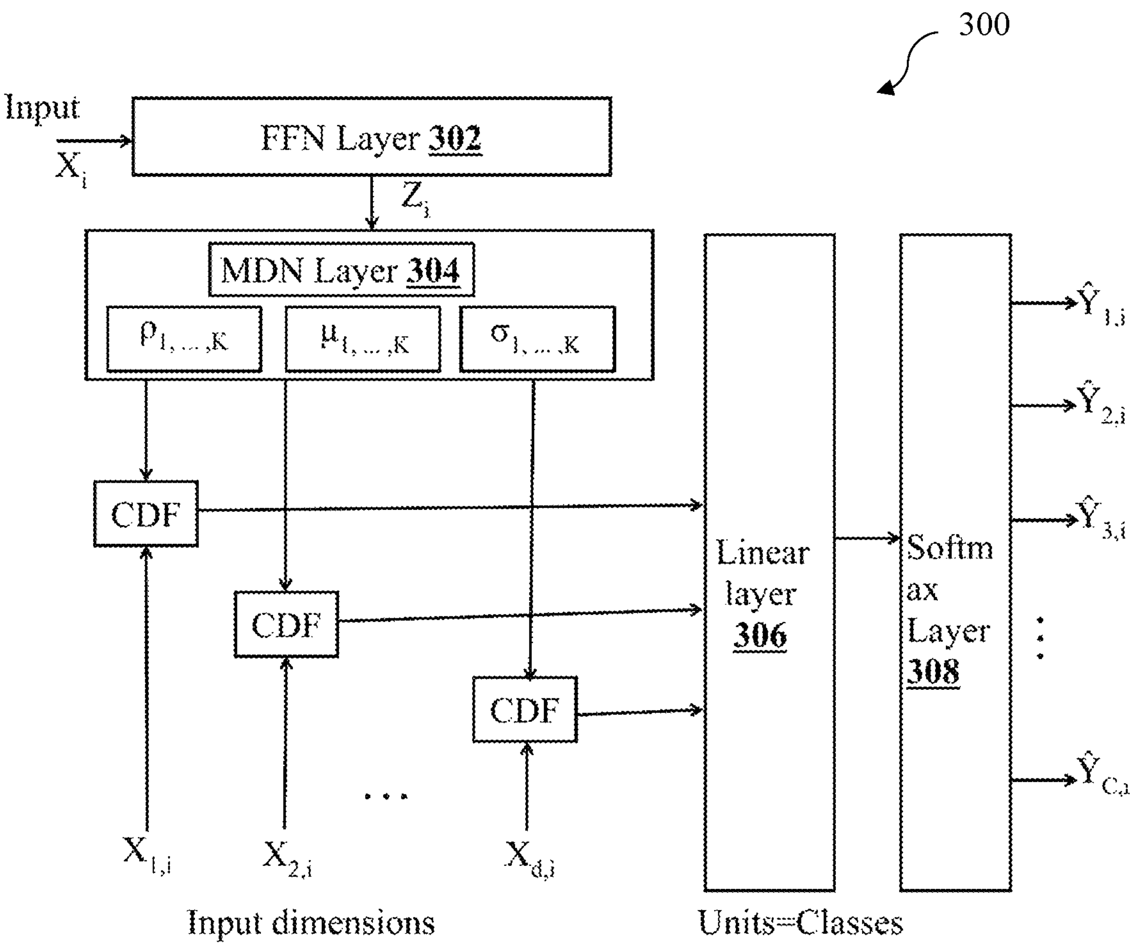
FIG. 3 illustrates an exemplary architecture of a mixture density network, in accordance with some embodiments of the present disclosure.

FIG. 3 illustrates an exemplary architecture of the mixture density network 300, in accordance with some embodiments of the present disclosure. As shown in FIG. 3, the mixture density network 300 includes a feed-forward layer 302 (FF neural network layer), a mixture density network layer 304, a linear layer 306, and a softmax layer 308. In an embodiment, the linear layer 306, and the softmax layer 308 can be formed as an integrated layer along with an activation function.

In an embodiment, training the mixture density network 300 with each d-dimensional training sample is explained through steps 204*a* to 204*f*. At step 204*a*, the d-dimensional training sample is passed to the feed-forward layer 302 to obtain a latent vector associated with the d-dimensional training sample.

Let $X_i$ denote a d-dimensional training sample i. The objective of the end-to-end classification model is to predict the class label (annotated) given the d-dimensional training sample $X_i$. In other words, the end-to-end classification model must predict class scores $$\hat{Y}_1^i, \hat{Y}_2^i, \ldots, \hat{Y}_C^i$$

given the d-dimensional training sample $X_i$, where C is the number of the plurality of class labels (the plurality of annotated class labels).

Let the feed-forward layer 302 contain r units, then the latent vector $Z_i$ (output of the feed-forward layer 302) of the d-dimensional training sample $X_i$ is mathematically represented as in equation (1):

$$Z_i = \mathrm{Tanh}\left[W_f . X_i^T + b_f\right) \tag{1}$$

Wherein Tanh denotes hyperbolic tangent activation function applied elementwise, and $W_f$ is the r×d weight matrix of the feed-forward layer 302.

At step 204*b*, the latent vector (obtained at step 204*a*) associated with the d-dimensional training sample, is passed to the mixture density network layer 304, to obtain one or more Gaussian mixture parameters associated with the d-dimensional training sample. The mixture density network layer 304 uses a mixture of Gaussians conditioned on the latent vector $Z_i$ of the d-dimensional training sample $X_i$. The mixture density network layer 304 includes a plurality of MDN layers which learns the distribution parameters which are called the Gaussian mixture parameters. The one or more Gaussian mixture parameters of the mixture density network layer 304 with K Gaussian components are obtained and are represented as in equations (2a) to (2c).

$$\rho_{1,i}, \rho_{2,i}, \ldots, \rho_{K,i} = \mathrm{softmax}\left(W_\rho . Z_i^T + b_\rho\right) \tag{2a}$$

$$\mu_{1,i}, \mu_{2,i}, \ldots, \mu_{K,i} = W_\mu . Z_i^T + b_\mu \tag{2b}$$

$$\sigma_{1,i}, \sigma_{2,i}, \ldots, \sigma_{K,i} = \mathrm{softplus}\left(W_\sigma . Z_i^T + b_\sigma\right) \tag{2c}$$

Where $W_\rho$, $W_\mu$, $W_\sigma$, $b_\rho$, $b_\mu$, $b_\sigma$ represents the learnable parameters of the mixture density network layer 304 with $\rho_{K,i}$, $\mu_{K,i}$, $\sigma_{K,i}$ denoting a mixture weight, a mixture mean and a mixture standard deviation of the $K^{th}$ Gaussian component for the $i^{th}$ d-dimensional training sample, respectively. The softmax activation ensures that $\rho_k \in [0, 1]$ and $$\sum_{k=1}^{K} \rho_k = 1$$

while the softplus activation ensures that the standard deviation term σ is positive. The outputs of the mixture density network layer 304 as formulated in equations (2a) to (2c) model the conditional distribution of the class labels $\hat{Y}_1, \hat{Y}_2, \ldots, \hat{Y}_C$ by leveraging the power of the mixture of the Gaussians.

At step 204*c*, one or more weighted cumulative distribution function (CDF) values associated with the d-dimensional training sample, are evaluated from the one or more Gaussian mixture parameters (obtained at step 204*b*) associated with the d-dimensional training sample, using a cumulative distribution function (CDF).

The one or more weighted cumulative distribution function (CDF) values associated with the d-dimensional training sample, are evaluated from the one or more Gaussian mixture parameters associated with the d-dimensional training sample, using the cumulative distribution function, by passing values associated with input dimensions of the d-dimensional training sample. The values associated with input dimensions of the d-dimensional training sample, that are passed are the values of the corresponding input variables present in the plurality of d-dimensional training samples. For example, {3.01, 1, 2} are the values (of input variables) present in row 2 of Table 1. In retail product bundling, the values are obtained from the item-level sale data.

The one or more weighted cumulative distribution function (CDF) values are evaluated using the one or more Gaussian mixture parameters with each of the input dimension $X_{1,i}, X_{2,i}, \ldots, X_{d,i}$ and each of the mixture component $k \in [1, 2, \ldots, K]$ as the following equation (3):

$$\hat{\Phi}_{k,m,i}^{w} = \rho_K . \Phi\left(\frac{X_{m,i} - \mu_k}{\sigma_k}\right) \tag{3}$$

Where Φ is the standard normal CDF value and $$\hat{\Phi}_{k,m,i}^{w}$$

is the weighted CDF value of the $k^{th}$ mixture component evaluated on the $i^{th}$ d-dimensional training sample of the $m^{th}$ input feature. It is convenient to view $$\hat{\Phi}_{k,m,i}^{w}$$

as the $(m, k)^{th}$ element of a d×K vector which, through a slight abuse of notation, denoted by $$\hat{\Phi}_{i}^{w}.$$

At step 204*d*, the one or more weighted cumulative distribution function (CDF) values (obtained at step 204*c*) associated with the d-dimensional training sample, are passed to the linear layer 306, and the softmax layer 308, to obtain a predicted class label associated with the d-dimensional training sample. The one or more weighted cumulative distribution function (CDF) values $$\hat{\Phi}_i^w$$

are passed through the softmax layer 308 after passing to the linear layer 306. The softmax layer 308 contains a softmax activation function to get the class scores as in equation (4):

$$\hat{Y}_{1,i}, \hat{Y}_{2,i}, \ldots, \hat{Y}_{C,i} = \mathrm{softmax}\left(W_o \cdot (\hat{\Phi}_i^w)^T + b_o\right) \quad (4)$$

Where $W_o$, $b_o$ are the learnable parameters of the linear layer 306 and the softmax layer 308 and $W_o$ is c×dK. The LASSO penalty is imposed on the weights $W_o$ so that only the most important weighted CDF values are used to predict the class label scores.

At step 204*e*, a value of a cross-entropy loss function of the mixture density network 300 is determined, using the predicted class label (obtained at step 204*d*) associated with the d-dimensional training sample and the associated annotated class label (received at step 202 of the method 200). In an embodiment, the cross-entropy loss function of the mixture density network 300 between the predicted class label and the annotated class label (original class label) is expressed as in equation (5):

$$\mathcal{L}_{CE} = -\frac{1}{N}\sum_{i=1}^{N}\sum_{c=1}^{C} Y_{i,c}.\log \hat{Y}_{i,c} \quad (5)$$

Where c∈[1, 2, . . . , C] is a plurality of annotated class labels, i denotes the $i^{th}$ d-dimensional training sample and N is the total number of d-dimensional training samples in the plurality of d-dimensional training samples received at step 202 of the method 200. The final loss function along with the $L_1$ constraint of the LASSO penalty on the weights of the softmax layer 308 is thus defined as in equation (6):

$$\mathcal{L} = \mathcal{L}_{CE} + \lambda.\|W_o\|_1 \quad (6)$$

Wherein λ is a regularization parameter which controls the level of sparsity in $W_o$ and helps to ensure that only the most important CDF values are used to predict the class label scores.

At step 204*f*, one or more network parameters (network weights) of the mixture density network 300, are updated based on the value of the cross-entropy loss function obtained at step 204*e*, for training with next d-dimensional training sample. In an embodiment, a back propagation technique is employed to the one or more network parameters (network weights) of the mixture density network 300. The end-to-end classification model is obtained once the mixture density network 300 is trained with the plurality of d-dimensional training samples. The end-to-end classification model is then can be used for predicting the class label in real-time based on the type of applications such as the product bundling application.

At step 206 of the method 200, the one or more hardware processors 104 of the system 100 are configured to receive a d-dimensional input sample for which the class label to be predicted in real-time. The d-dimensional input sample contains d number of input dimensions that are associated with the predefined application for which the end-to-end model is obtained at step 204 of the method 200. Further, the d-dimensional input sample includes input values associated with the d number of input dimensions of the d-dimensional input sample.

At step 208 of the method 200, the one or more hardware processors 104 of the system 100 are configured to pass the d-dimensional input sample and the input values associated with the d number of input dimensions of the d-dimensional input sample, received at step 208 of the method 200, to the end-to-end classification model obtained at step 204 of the method 200, to obtain the predicted class label associated with the d-dimensional input sample.

Figure 4:
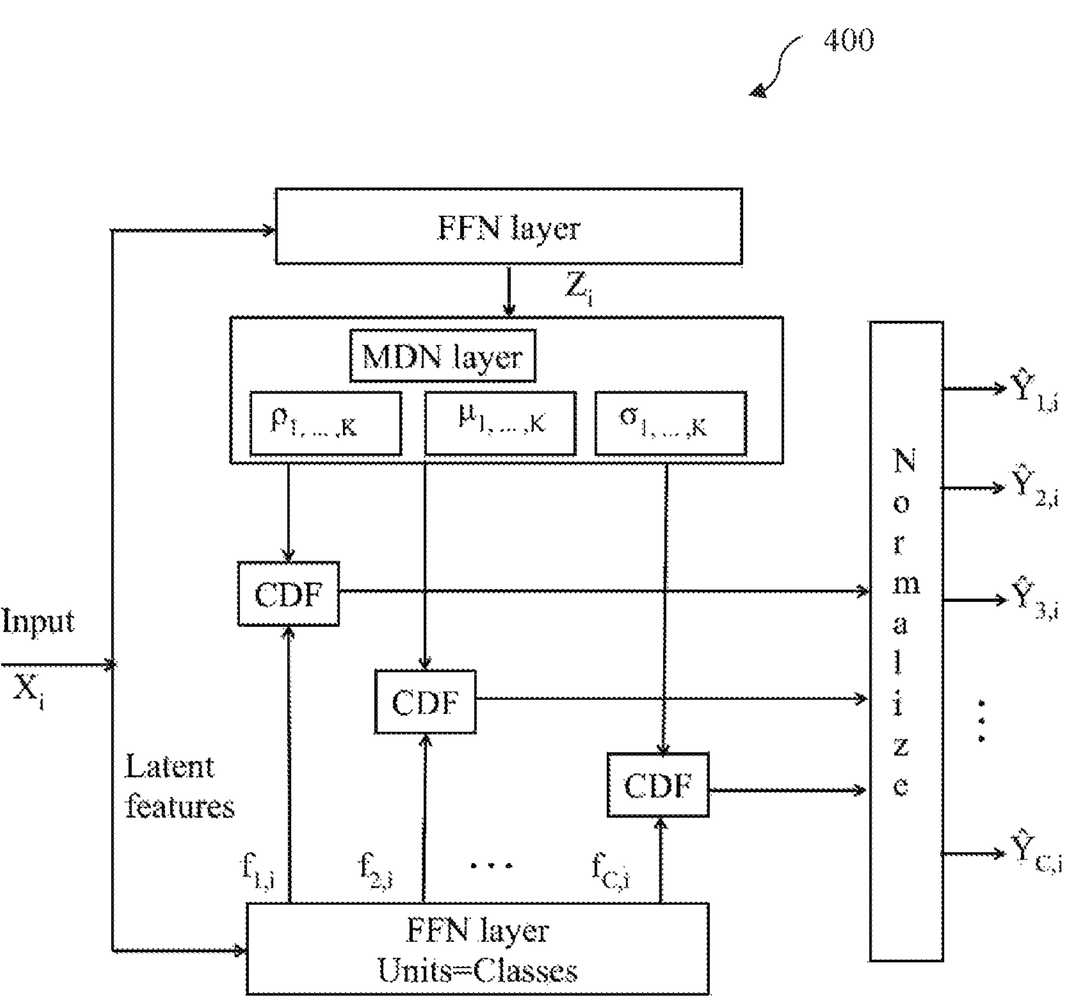
FIG. 4 illustrates another exemplary architecture of the mixture density network, in accordance with some embodiments of the present disclosure.

The exemplary architecture of the mixture density network 300 is named as MDN-C1 in the present disclosure. FIG. 4 illustrates another exemplary architecture of the mixture density network 400, in accordance with some embodiments of the present disclosure. Another exemplary architecture of the mixture density network 400 is named as MDN-C2 in the present disclosure.

The MDN-C2 based classification model differs from MDN-C1 in one chief aspect. In MDN-C2, the latent features are learned by passing the input samples through the feed-forward layer instead of using the original input features to evaluate the CDF values. The units in the feedforward layer are equal in number to the total number of classes in the dataset. The latent features $f_{1,i}$, $f_{2,i}$, . . . , $f_{C,i}$ are used to evaluate the CDF values as in equation 3 in place of original features $X_{1,i}$, $X_{2,i}$, . . . , $X_{d,i}$. The MDN parameters are used to evaluate the CDF value $\hat{\Phi}_{m,i}$ corresponding to the $i^{th}$ sample of the $m^{th}$ latent feature as in equation (7):

$$\hat{\Phi}_{m,i} = \sum_{k=1}^{K} \hat{\Phi}_{k,m,i}^w \quad (7)$$

Where m∈[1, 2, . . . , C]. The evaluated CDF values $\hat{\Phi}_{1,i}$, $\hat{\Phi}_{2,i}$, . . . , $\hat{\Phi}_{C,i}$ are then normalized to get the class scores in the range ∈[0, 1]. Thus, the normalized class score on a sample i for a class c∈[1, 2, . . . , C] is given in equation (8):

$$\hat{Y}_{c,i} = \left[\sum_{c=1}^{C} \hat{\Phi}_{c,i}\right]^{-1}.\hat{\Phi}_{c,i} \quad (8)$$

The predicted class scores are then used to calculate the cross-entropy loss as in equation 5 for MDN-C2.

Example Scenario:

The performance of the proposed MDN models for classification, namely, MDN-C1 and MDN-C2 were compared with standard ANN-based classification. The experiments were performed on three publicly available datasets from University of California Irvine (UCI) machine learning data repository, especially, i) the Pima Indians Diabetes dataset, ii) the Waveform Generator dataset, and iii) the Multiple Features dataset. The metrics considered for the performance comparison are accuracy, precision, recall and F1-score metrics. Table 2 shows the datasets considered in this exposition have sufficient variety with the number of classes ranging from 2 to 10 and the input dimensions varying from 8 to 649. As shown in Table 2, the datasets include the number of classes C, the number of input dimensions d, the number of samples N and class split.

TABLE 2

| Dataset | Classes (C) | Input dimensions (d) | Total samples (N) | Class split (%) |
|---|---|---|---|---|
| Pima Indians Diabetes dataset | 2 | 8 | 768 | 65(Class-0)/ 35(Class-1) |

TABLE 2-continued

| Dataset | Classes (C) | Input dimensions (d) | Total samples (N) | Class split (%) |
|---|---|---|---|---|
| Waveform Generator dataset | 3 | 40 | 5000 | 33.33(Class-0)/ 33.33(Class-1)/ 33.33(Class-2) |
| Multiple Features dataset | 10 | 649 | 2000 | 10 equiprobable classes |

Datasets Description: The description of the datasets is explained below.

(1) Pima Indians Diabetes dataset: The classification task on this dataset is to predict whether or not a patient has diabetes based on certain diagnostic measurements such as age, number of pregnancies, plasma glucose, blood pressure, insulin etc. The diagnostic measurements are of females of Pima Indian heritage with age 21 years or more.

(2) Waveform Generator dataset: This dataset consists of three classes of waveforms. Each class is generated from a combination of two of three base waves. Each waveform is described by a total of 40 noisy features, 19 of which are all noise attributes with mean 0 and variance 1. In this dataset, the task is to classify the input sample into one of the three classes.

(3) Multiple Features dataset: This dataset consists features of handwritten digits (0-9). There are 200 patterns for each digit. Six features such as Fourier coefficients, profile correlations, Karhunen-Love coefficients, Zernike moments etc., are extracted from the character shapes to represent the digits. The task in this dataset is to classify the sample into one of the ten classes.

Training details: In the training process, each dataset was divided into train, validation, and test sets. Z-normalization was used to normalize train, validation, and test sets by obtaining train set statistics. The k-fold cross-validation technique was employed with k being 5 in performance evaluation of the models. The optimal neural network was selected as the one with the least cross-entropy loss on the hold-out validation set in each fold via grid search on following hyper-parameters: feed-forward layers in Z are $l \in \{1,2\}$, number of units per layer $r \in \{5, 10, 20, 20, 50, 100\}$, number of mixtures in MDN layer $K \in \{1, 2, 3, 4, 5, 10\}$ and a dropout rate of 0.3 in the feed-forward layers for regularization. The number of units r is kept the same in all the layers. The sparsity controlling parameter $\lambda$ is chosen from $\{0, 0.001, 0.0001\}$ for MDN-C1. A similar tuning procedure was used to optimize the performance of the ANN baseline. Each experiment was conducted for five folds. Table 3 shows the performance of proposed MDN based classification models (MDN-C1 and MDN-C2) with the ANN model. The numbers in parentheses represent standard deviation values.

TABLE 3

| Dataset | Model | Accuracy | Precision | Recall | F1-score |
|---|---|---|---|---|---|
| Pima | ANN | 0.765(0.018) | 0.761(0.020) | 0.765(0.018) | 0.759(0.018) |
| Indians | MDN-C1 | 0.769(0.010) | 0.771(0.014) | 0.769(0.010) | 0.769(0.011) |
| Diabetes | MDN-C2 | 0.768(0.013) | 0.764(0.014) | 0.768(0.013) | 0.764(0.014) |
| Waveform | ANN | 0.860(0.011) | 0.861(0.011) | 0.860(0.011) | 0.859(0.012) |
| Generator | MDN-C1 | 0.859(0.009) | 0.859(0.009) | 0.859(0.009) | 0.858(0.009) |
| | MDN-C2 | 0.862(0.008) | 0.863(0.008) | 0.862(0.008) | 0.861(0.009) |
| Multiple | ANN | 0.987(0.002) | 0.987(0.002) | 0.987(0.002) | 0.987(0.002) |
| Features | MDN-C1 | 0.987(0.003) | 0.987(0.003) | 0.987(0.003) | 0.986(0.003) |
| | MDN-C2 | 0.985(0.004) | 0.985(0.004) | 0.985(0.004) | 0.984(0.004) |

As shown in Table 3, the proposed MDN-C models (MDN-C1 and MDN-C2) of the systems and methods of the present disclosure were superior to the ANN-based classification model on all metrics for the Pima Indians Diabetes dataset. Moreover, MDNC1 was slightly better than MDN-C2. On the Waveform Generator dataset, MDN-C2 performed better than MDNC1 and ANN models on all metrics. MDN-C1 model performed at par with the ANN-based classification model on the Multiple Features dataset.

In product bundling application: the objective in the application of the proposed MDN based classification models (MDN-C1 and MDN-C2) in the product bundling was to estimate the willingness-to-pay (WTP) distribution for a bundle of items from the WTP distributions for individual items learnt from sales data of the individual items using the proposed MDN-C models. For the ground truth model, the systems and methods of the present disclosure assumed that the WTP distribution for items is exponential with rate $\lambda$. This ground truth model was used to generate item-level sales data as follows: each arriving customer was offered an item i at a price p. At the same time, the customer's WTP was sampled from the assumed WTP distribution, and a sale was recorded if and only if the sampled WTP was greater than the offer price p. The data consists only of the offer price and a binary indicator indicating if a sale was made. Note that the underlying WTP distribution was typically unknown. Towards the proposed MDN models can approximate the item-level WTP distributions by using the sales data. The underlying classification task was to predict sale, or no sale given the price. The learned item level MDN model parameters, namely, mixture coefficients $\rho_1, \ldots, K$, means $\mu_1, \ldots, K$ and standard deviations $\sigma_1, \ldots, K$ were then used to learn the bundle WTP distribution via convolution as described below.

Consider a bundle with two items $i_1$ and $i_2$ and denote the corresponding WTP random variable by $T_1$ and $T_2$ respectively. It was assumed that the corresponding WTP distribution for items $i_1$ and $i_2$ follow exponential distributions with rate parameters $\lambda_1=0.03$ and $\lambda_2=0.02$ respectively.

Then the purchase probability $V_1(p):=\mathbb{P}(T_1 \geq p)$ for item $i_1$ is equal to $\exp(-\lambda_1 . p)$. Similarly, for item $i_2$, $V_2(p):=\exp(-\lambda_2 . p)$ is defined. Another assumption has been made that the bundle WTP variable $T_b$ was an addition of the WTP variables $T_1$ and $T_2$, i.e., $T_b=T_1+T_2$. The assumption was a standard one in choice modeling theory and was based on the intuition that a customer will buy a bundle if and only if it was offered at a price that does not exceed the sum of the individual amounts that the customer was willing to pay for the items separately. Since the WTP for the individual items are independent, the WTP distribution of the bundle was easily seen to be the convolution of the WTP distributions of the individual items. Thus, under the assumption, it can be seen that $T_b$ follows a hypo-exponential distribution with parameters $\lambda_1$ and $\lambda_2$. Furthermore, it's mean value is $$\frac{1}{\lambda_1} + \frac{1}{\lambda_2}$$

and the corresponding bundle purchase probability $V_b(p)$ at price p equals $$\frac{\lambda_2}{\lambda_2 - \lambda_1} \exp(-\lambda_1 . p) - \frac{\lambda_1}{\lambda_2 - \lambda_1} \exp(-\lambda_2 . p).$$

Let the learned item level probability density functions (PDFs) using MDN-C1 and MDN-C2 models be $$f(p) = \sum_{k=1}^{K} \rho_k N(p \mid \mu_K, \sigma_K),$$

$$g(p) = \sum_{j=1}^{N} \rho_j N(p \mid \mu_j, \sigma_j)$$

for items $i_1$ and $i_2$, respectively. Since $T_b=T_1+T_2$, the PDF for $T_b$ can be obtained as the convolution $h(\cdot)=f(\cdot)*g(\cdot)$ of $f(\cdot)$ and $g(\cdot)$. This convolution is particularly straightforward since f and g are mixtures of Gaussians, and is given by equation (9):

$$h(p) = \left(\sum_{k=1}^{K} \rho_k N(p|\mu_K, \sigma_K)\right) * \left(\sum_{j-1}^{M} \rho_j N(p|\mu_j, \sigma_j)\right) \tag{9}$$

$$h(p) = \sum_{k=1}^{K} \sum_{j=1}^{M} \rho_k \rho_j N\left(p \middle| \mu_K + \mu_j, \sqrt{\sigma_k^2 + \sigma_j^2}\right)$$

In the experiment, a bundle with two products (Item-1 and Item-2) was considered in this exposition, which can be easily extended to more products. The MDN-C1 model was utilized with following modifications in this experiment: The input to intermediate term Z was constant and dummy, so that the MDN parameters are independent of the offered price. The other modification was that the final softmax layer to predict class scores has been discarded. The CDF values were evaluated with respect to price and the resulting CDF value was used to decide sale or no sale. In the experiments, the offered price for the items and bundle has been in the range of 0-300, units r=70, layers l=1 and the number of mixture components $K \in \{1, 2, 3\}$. The experiments were conducted for five seeds. The average and standard deviation (in parentheses) of the estimated mean of the learned WTP distribution of five runs are reported in Table 4.

TABLE 4

| | True | Estimated Mean | | |
|---|---|---|---|---|
| | Mean | K = 1 | K = 2 | K = 3 |
| Item-1 | 33.33 | 25.24(0.76) | 32.80(1.56) | 33.00(1.54) |
| Item-2 | 50 | 36.93(0.65) | 48.83(1.80) | 49.51(1.69) |
| Bundle | 83.33 | 62.17(1.09) | 81.63(2.63) | 82.51(2.27) |

In the Table 4, the estimated purchase probabilities for both the items and the bundle as well as the corresponding true probabilities calculated according to the ground truth model have been plotted as functions of the offer price p.

Figure 5A:
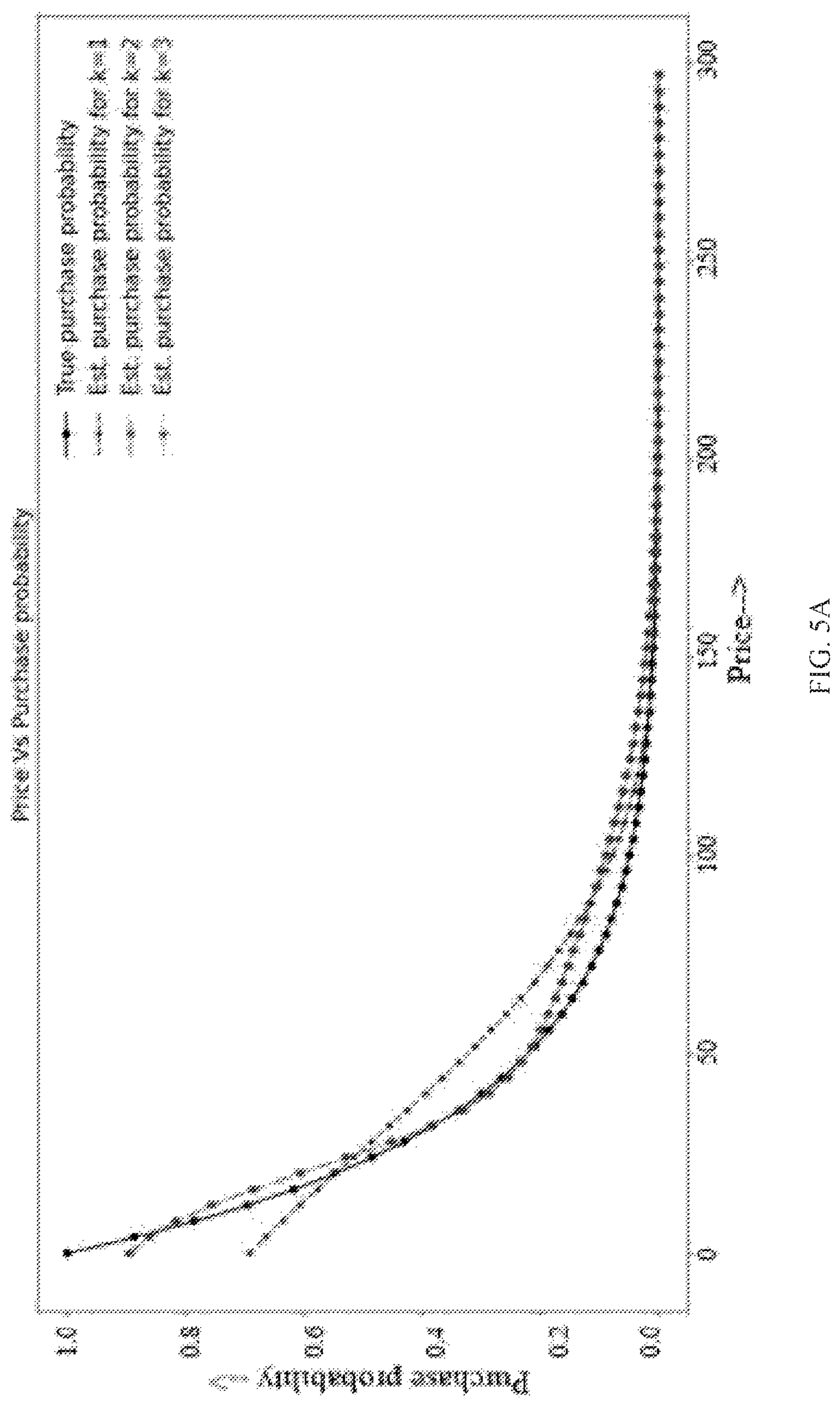
FIGS. 5A through 5C are graphs showing an item-1 purchase probability, an item-2 purchase probability and a bundle purchase probability for a given price, respectively, in accordance with some embodiments of the present disclosure.
Figure 5B:
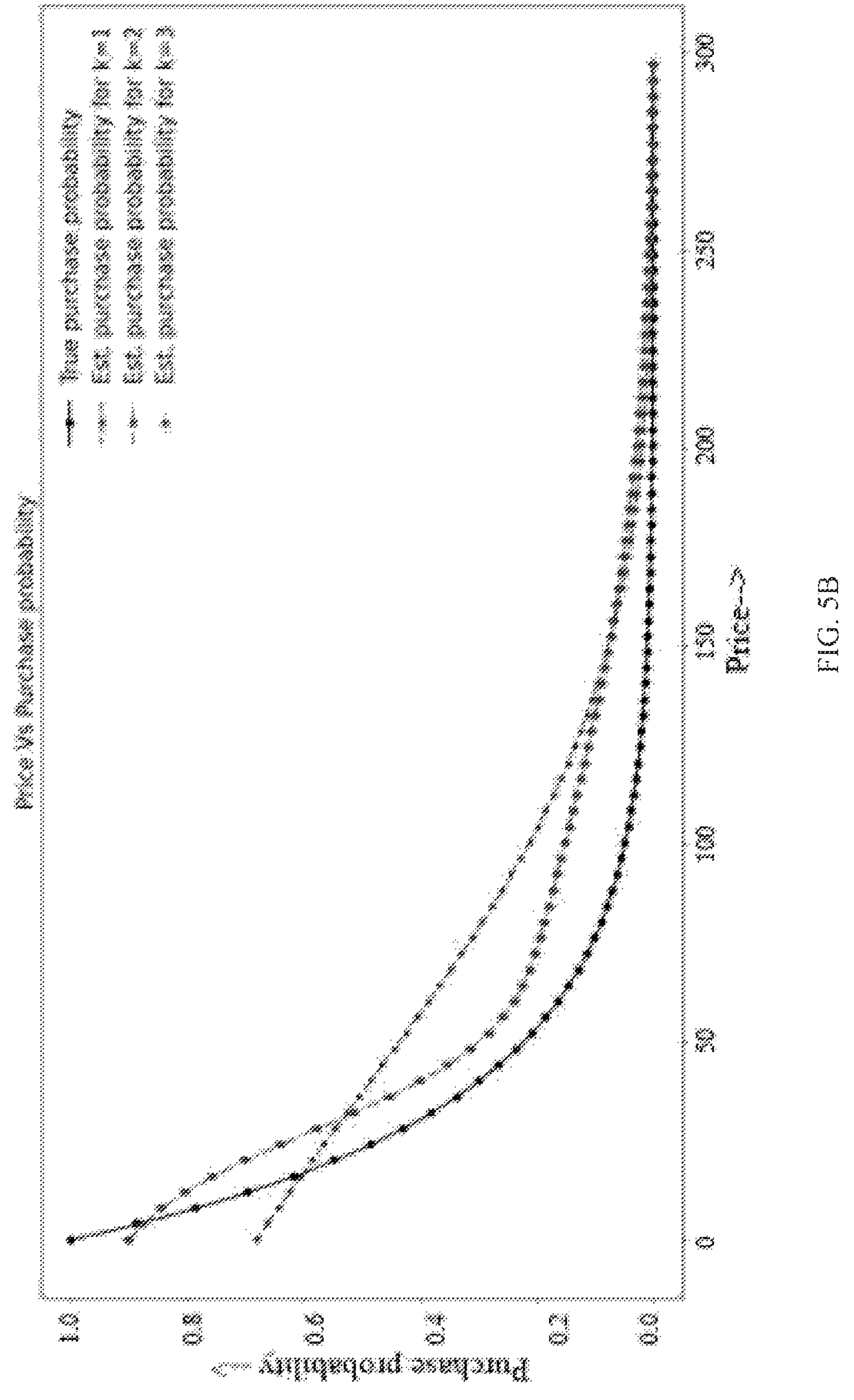
Figure 5C:
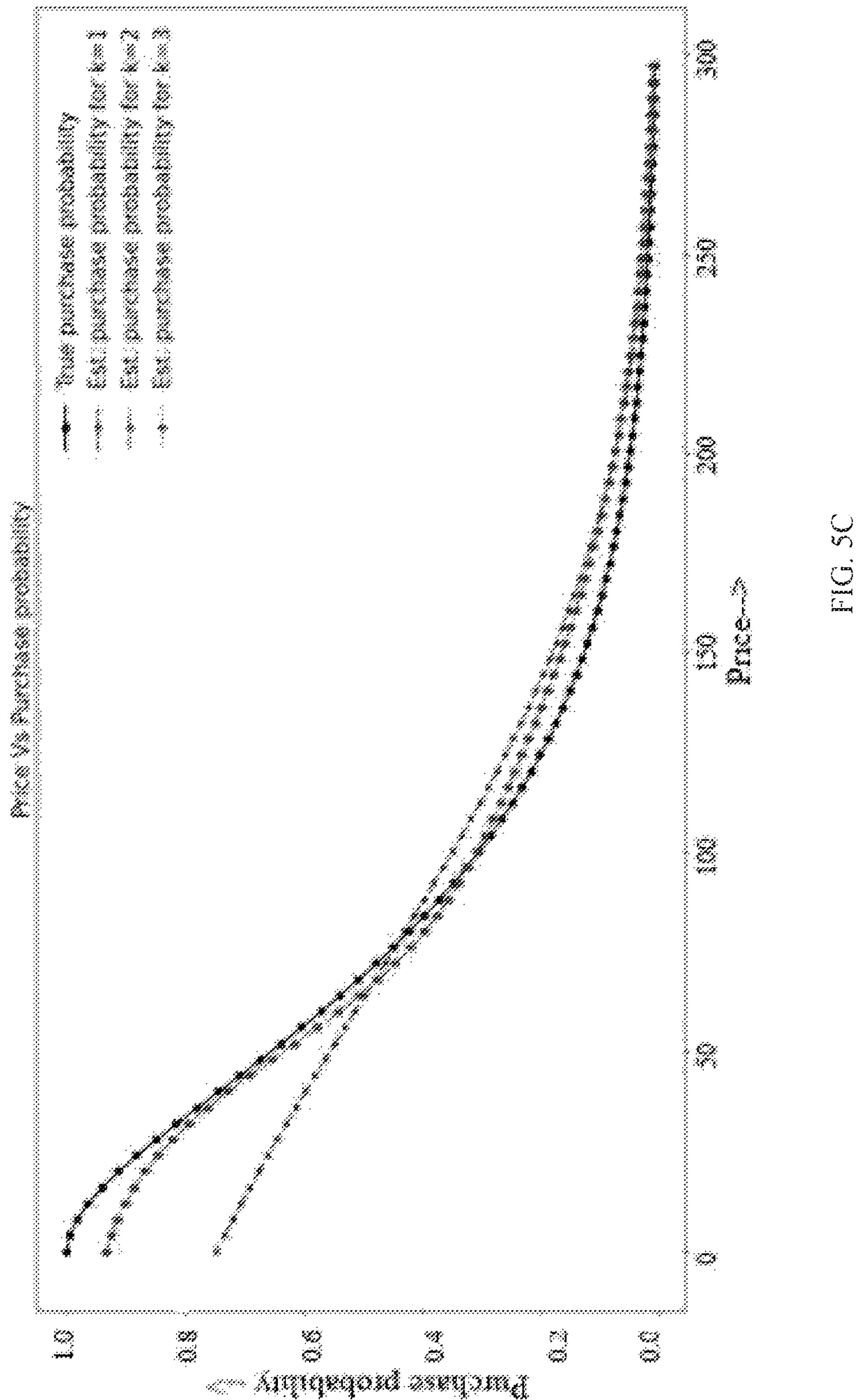
Figure 5D:
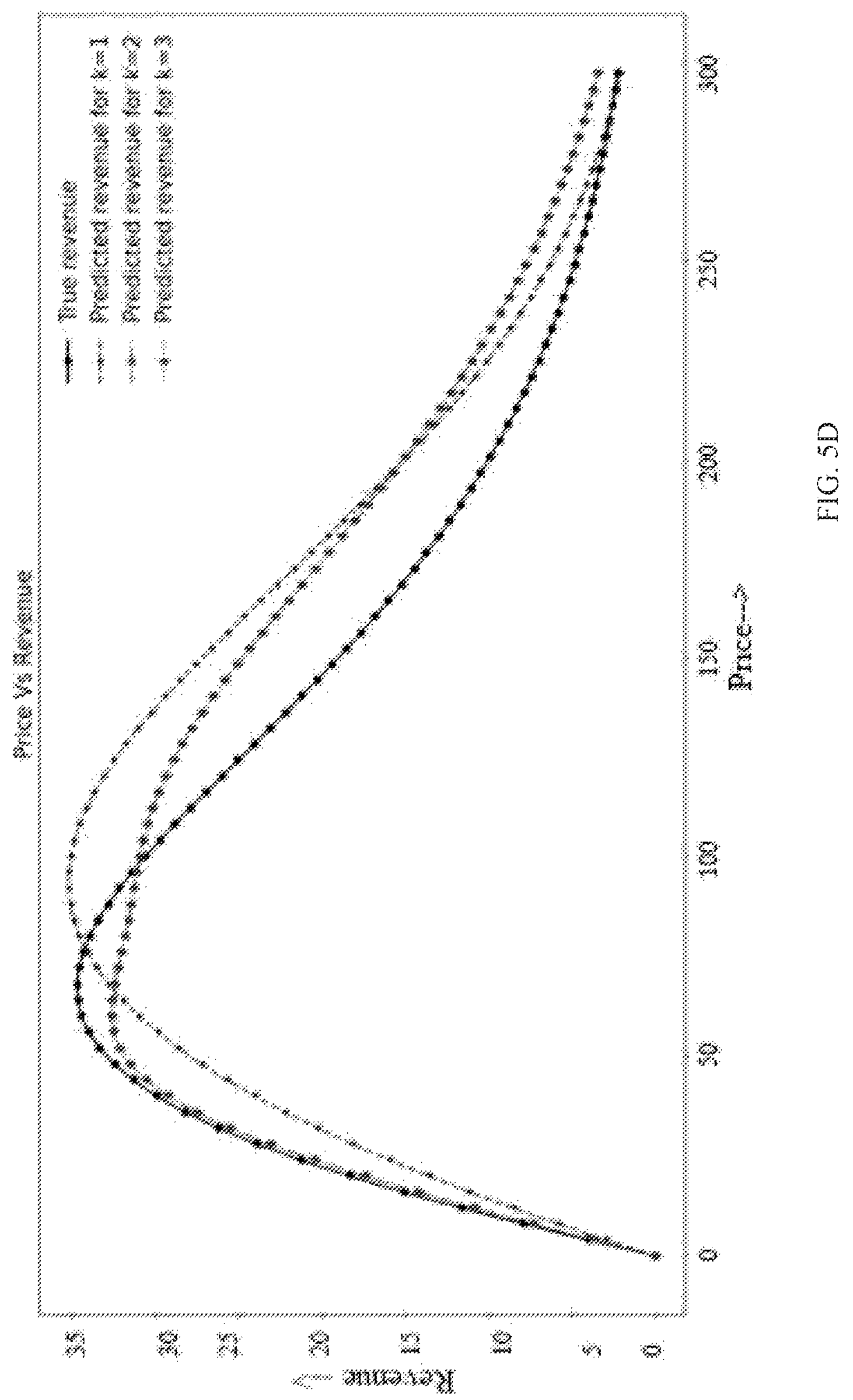
FIG. 5D is a graph showing a revenue from the bundle purchase, in accordance with some embodiments of the present disclosure.

FIGS. 5A through 5C are graphs showing an item-1 purchase probability, an item-2 purchase probability and a bundle purchase probability for a given price, respectively, in accordance with some embodiments of the present disclosure. FIG. 5D is a graph showing a revenue from the bundle purchase, in accordance with some embodiments of the present disclosure.

The following points were observed from Table 4 and FIGS. 5A through 5D:

(i) Item-level WTP distributions are learned well as shown in FIG. 5A and FIG. 5B. The true and estimated purchase probabilities are matching. True and estimated means parameters are also very close for K=3.

(ii) Increasing the number of mixture components helps to learn the true WTP distributions better. Also, MDN-C1 with K=3 performs better.

(iii) The approximated purchase probability and expected revenue for the bundle closely match the ground truth as shown in FIG. 5C and FIG. 5D.

(iv) The learned bundle distribution then used to estimate revenue maximizing price (FIG. 5D).

The embodiments of present disclosure herein provides mixture density network-based classification models, both fit mixtures of Gaussians to the data and use the fitted distributions to classify a given sample by evaluating the learnt cumulative distribution function for the given input features. The mixture density network-based classification models as implemented by the systems and methods of the present disclosure can learn the willingness-to-pay (WTP) distributions for two products from synthetic sales data of the individual products. The Gaussian mixture representation of the learned WTP distributions is then exploited to obtain the WTP distribution of the bundle consisting of both the products. The MDN-based models can approximate the true WTP distributions of both items and the bundle well. The mixture density network-based classification models are trained end-to-end, for solving the classification tasks. The features of the proposed mixture density network-based classification model are:

(i) Captures the intrinsic multi-modality present in the data.

(ii) Approximates the distribution underlying the data. Also, learns the parameters of the distribution.

(iii) Performs on par or better than ANN based classification models.

(iv) Learns bundle willingness-to-pay distribution using item level sales data.

(v) Ease in combining with powerful deep learning techniques such as RNNs, CNNs and Transformers.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the present disclosure or if they include equivalent elements with insubstantial differences from the literal language of the embodiments described herein.

The embodiments of present disclosure herein address unresolved problem of obtaining the end-to-end classification models using the MDNs for the classification tasks such as product bundling applications. The experimental results shows that the MDN models of the present disclosure perform better than the ANN-based models for the classification tasks.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for obtaining an end-to-end classification model using a mixture density network, comprising the steps of:

receiving, via one or more hardware processors, a plurality of d-dimensional training samples, and an annotated class label associated with each d-dimensional training sample of the plurality of d-dimensional training samples; and training, via the one or more hardware processors, the mixture density network with each d-dimensional training sample at a time, until the plurality of d-dimensional training samples are completed, using the annotated class label associated with each d-dimensional training sample, to obtain the end-to-end classification model, wherein the mixture density network comprises a feed-forward layer, a mixture density network layer, a linear layer, and a softmax layer, and wherein training the mixture density network with each d-dimensional training sample comprises:

passing each d-dimensional training sample to the feed-forward layer to obtain a latent vector associated with each d-dimensional training sample;

passing the latent vector associated with each d-dimensional training sample, to the mixture density network layer, to obtain one or more Gaussian mixture parameters associated with each d-dimensional training sample;

evaluating one or more weighted cumulative distribution function (CDF) values associated with each d-dimensional training sample, from the one or more Gaussian mixture parameters associated with each d-dimensional training sample, using a cumulative distribution function (CDF);

passing the one or more weighted cumulative distribution function (CDF) values associated with each d-dimensional training sample, to the linear layer, and the softmax layer, to obtain a predicted class label associated with each d-dimensional training sample;

determining a value of a cross-entropy loss function of the mixture density network, using the predicted class label, associated with each d-dimensional training sample and the associated annotated class label; and updating one or more network parameters of the mixture density network, based on the value of a cross-entropy loss function, for training with a next d-dimensional training sample.

2. The processor-implemented method of claim 1, further comprising:

receiving, via the one or more hardware processors, a d-dimensional input sample having d number of input dimensions that are associated with a predefined application, and one or more input values associated with the d number of input dimensions of the d-dimensional input sample; and passing, via the one or more hardware processors, the d-dimensional input sample and the one or more input values associated with the d number of input dimensions of the d-dimensional input sample, to the end-to-end classification model, to obtain the predicted class label associated with the d-dimensional input sample.

3. The processor-implemented method of claim 1, wherein each d-dimensional training sample comprises d number of input dimensions.

4. The processor-implemented method of claim 1, wherein the annotated class label associated with each d-dimensional training sample is of a plurality of annotated class labels corresponding to the plurality of d-dimensional training samples.

5. The processor-implemented method of claim 1, wherein the one or more weighted cumulative distribution function (CDF) values associated with the d-dimensional training sample, are evaluated from the one or more Gaussian mixture parameters associated with the d-dimensional training sample, using the cumulative distribution function, by passing one or more values associated with the d number of input dimensions of the d-dimensional training sample.

6. A system for obtaining an end-to-end classification model using a mixture density network, comprising:

a memory storing instructions;

one or more input/output (I/O) interfaces; and one or more hardware processors coupled to the memory via the one or more I/O interfaces, wherein the one or more hardware processors are configured by the instructions to:

receive a plurality of d-dimensional training samples, and an annotated class label associated with each d-dimensional training sample of the plurality of d-dimensional training samples; and train the mixture density network with each d-dimensional training sample at a time, until the plurality of d-dimensional training samples are completed, using the annotated class label associated with each d-dimensional training sample, to obtain the end-to-end classification model, wherein the mixture density network comprises a feed-forward layer, a mixture density network layer, a linear layer, and a softmax layer, and wherein training the mixture density network with each d-dimensional training sample comprises:

passing each d-dimensional training sample to the feed-forward layer to obtain a latent vector associated with each d-dimensional training sample;

passing the latent vector associated with each d-dimensional training sample, to the mixture density network layer, to obtain one or more Gaussian mixture parameters associated with each d-dimensional training sample;

evaluating one or more weighted cumulative distribution function (CDF) values associated with each d-dimensional training sample, from the one or more Gaussian mixture parameters associated with each d-dimensional training sample, using a cumulative distribution function (CDF);

passing the one or more weighted cumulative distribution function (CDF) values associated with each d-dimensional training sample, to the linear layer, and the softmax layer, to obtain a predicted class label associated with each d-dimensional training sample;

determining a value of a cross-entropy loss function of the mixture density network, using the predicted class label, associated with each d-dimensional training sample and the associated annotated class label; and updating one or more network parameters of the mixture density network, based on the value of a cross-entropy loss function, for training with a next d-dimensional training sample.

7. The system of claim 6, wherein the one or more hardware processors are further configured to:

receive a d-dimensional input sample having d number of input dimensions that are associated with a predefined application, and one or more input values associated with the d number of input dimensions of the d-dimensional input sample; and pass the d-dimensional input sample and the one or more input values associated with the d number of input dimensions of the d-dimensional input sample, to the end-to-end classification model, to obtain the predicted class label associated with the d-dimensional input sample.

8. The system of claim 6, wherein each d-dimensional training sample comprises d number of input dimensions.

9. The system of claim 6, wherein the annotated class label associated with each d-dimensional training sample is of a plurality of annotated class labels corresponding to the plurality of d-dimensional training samples.

10. The system of claim 6, wherein the one or more hardware processors are configured to evaluate the one or more weighted cumulative distribution function (CDF) values associated with the d-dimensional training sample, from the one or more Gaussian mixture parameters associated with the d-dimensional training sample, using the cumulative distribution function, by passing one or more values associated with the d number of dimensions of the d-dimensional training sample.

11. One or more non-transitory machine-readable information storage mediums comprising one or more instructions which when executed by one or more hardware processors cause:

receiving, a plurality of d-dimensional training samples, and an annotated class label associated with each d-dimensional training sample of the plurality of d-dimensional training samples; and training, the mixture density network with each d-dimensional training sample at a time, until the plurality of d-dimensional training samples are completed, using the annotated class label associated with each d-dimensional training sample, to obtain the end-to-end classification model, wherein the mixture density network comprises a feed-forward layer, a mixture density network layer, a linear layer, and a softmax layer, and wherein training the mixture density network with each d-dimensional training sample comprises:

passing each d-dimensional training sample to the feed-forward layer to obtain a latent vector associated with each d-dimensional training sample;

passing the latent vector associated with each d-dimensional training sample, to the mixture density network layer, to obtain one or more Gaussian mixture parameters associated with each d-dimensional training sample;

evaluating one or more weighted cumulative distribution function (CDF) values associated with each d-dimensional training sample, from the one or more Gaussian mixture parameters associated with each d-dimensional training sample, using a cumulative distribution function (CDF);

passing the one or more weighted cumulative distribution function (CDF) values associated with each d-dimensional training sample, to the linear layer, and the softmax layer, to obtain a predicted class label associated with each d-dimensional training sample;

determining a value of a cross-entropy loss function of the mixture density network, using the predicted class label, associated with each d-dimensional training sample and the associated annotated class label; and updating one or more network parameters of the mixture density network, based on the value of a cross-entropy loss function, for training with a next d-dimensional training sample.

12. The one or more non-transitory machine-readable information storage mediums of claim 11, further comprising:

receiving, a d-dimensional input sample having d number of input dimensions that are associated with a pre-defined application, and one or more input values associated with the d number of input dimensions of the d-dimensional input sample; and passing, the d-dimensional input sample and the one or more input values associated with the d number of input dimensions of the d-dimensional input sample, to the end-to-end classification model, to obtain the predicted class label associated with the d-dimensional input sample.

13. The one or more non-transitory machine-readable information storage mediums of claim 11, wherein each d-dimensional training sample comprises d number of input dimensions.

14. The one or more non-transitory machine-readable information storage mediums of claim 11, wherein the annotated class label associated with each d-dimensional training sample is of a plurality of annotated class labels corresponding to the plurality of d-dimensional training samples.

15. The one or more non-transitory machine-readable information storage mediums of claim 11, wherein the one or more weighted cumulative distribution function (CDF) values associated with the d-dimensional training sample, are evaluated from the one or more Gaussian mixture parameters associated with the d-dimensional training sample, using the cumulative distribution function, by passing one or more values associated with the d number of input dimensions of the d-dimensional training sample.

* * * * *